US008645689B2

(12) United States Patent
Alam et al.

(10) Patent No.: US 8,645,689 B2
(45) Date of Patent: Feb. 4, 2014

(54) STATELESS AGENT

(75) Inventors: Bilal Alam, Sammamish, WA (US); Clea (Faith) Allington, Bellevue, WA (US); Madhur Joshi, Kirkland, WA (US); Nina Tang, Kirkland, WA (US); Kanwaljeet Singla, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 443 days.

(21) Appl. No.: 12/354,971

(22) Filed: Jan. 16, 2009

(65) Prior Publication Data
US 2010/0185856 A1    Jul. 22, 2010

(51) Int. Cl.
*H04L 29/06* (2006.01)
*H04L 9/32* (2006.01)

(52) U.S. Cl.
USPC ............................ 713/168; 713/150; 713/170

(58) Field of Classification Search
USPC ......................................... 713/168, 150, 170
See application file for complete search history.

(56) References Cited

U.S. PATENT DOCUMENTS

| 6,240,088 | B1* | 5/2001 | Gayton et al. | 370/389 |
|---|---|---|---|---|
| 6,381,742 | B2* | 4/2002 | Forbes et al. | 717/176 |
| 7,203,173 | B2 | 4/2007 | Bonney et al. | |
| 2004/0059711 | A1 | 3/2004 | Jandel et al. | |
| 2007/0162538 | A1* | 7/2007 | Kim et al. | 709/200 |
| 2007/0198656 | A1 | 8/2007 | Mazzaferri et al. | |
| 2008/0082650 | A1 | 4/2008 | Takata et al. | |
| 2008/0219261 | A1 | 9/2008 | Lin et al. | |

OTHER PUBLICATIONS

Myers, et al. "Local Mail Transfer Protocol", Retrieved at<<http://tools.ietf.org/html/rfc2033>>, Oct. 1996, pp. 15.
"Web Application Session Management Security", Retrieved at<<http://www.nus.edu.sg/comcen/security/newsletter/july2003/Session.htm>>, Nov. 19, 2008, pp. 1-3.
"UF Guidelines to Develop Applications for Secure Deployment", Retrieved at<<http://www.it.ufl.edu/policies/guidelines.html>>, Nov. 19, 2008, pp. 13.
"Computer Network Router", Retrieved at<<http://www.electronics-manufacturers.com/info/networking-equipment/computer-network-router.html>>, Jan. 3, 2007, pp. 4.
Palmer, et al."Secure Session Management with Cookies for Web Applications", Retrieved at<<http://www.isecpartners.com/files/web-session-management.pdf>>, Sep. 10, 2008, pp. 18.

* cited by examiner

*Primary Examiner* — Carl Colin
*Assistant Examiner* — John Elmore

(57) ABSTRACT

Secure and stateless data transfer between a source agent at a first computer system and a destination agent at a second computer system is provided. A first list of labels of content structures is generated at the first computer system. During a first data transfer session, the first list, authentication information, at least one object included in the content structures, and file identifiers for one or more files included in the content structures are transferred from the first computer system to the second computer system. A second list is generated at the second computer system and received at the first computer system. The second list lists at least one requested file identified by the transmitted file identifier(s). During a second data transfer session, authentication information, the first list, the at least one object, and the requested file(s) are transferred from the first computer system to the second computer system.

20 Claims, 8 Drawing Sheets

100

200

700

800

900

1000

1100

1200

STATELESS AGENT

BACKGROUND

Computer systems may be coupled together in various ways to enable communications between them, including being coupled together in networks such as local area networks (LANs), wide area networks (WANs), or combinations of networks, such as the Internet. Data may be transferred (e.g., copied or moved) between computer systems in various ways. For example, a particular data file may be transmitted from a source computer system to a destination computer system in the form of a stream of packets. In the case of IP (Internet protocol) packets, each packet contains a portion of the data of the data file, and includes an IP address for the destination computer system. The destination computer system receives the stream of packets, reassembles the data file, and may store and/or process the data file in any manner.

An important issue in computer communications is the maintaining of security for the transferred data. It is desired to be able to transfer data between computer systems over a network without the data being intercepted and exploited by unintended entities (e.g., third parties). Various security protocols exist for securing communications by authenticating and/or encrypting each data packet of a data stream. Examples of such security protocols include Internet Protocol Security (IPsec), Secure Sockets Layer (SSL), Transport Layer Security (TLS), and Secure Shell (SSH).

A computer system may include an "agent" configured to enable secure data transfers with other computer systems. A first agent (e.g., at the source computer system) may ensure that data packets representing objects (e.g., content) are sent in order and as part of a session, and a corresponding agent (e.g., at the destination computer system) determines whether the data packets are received in order and if any data packets are not received. Agents may be configured in various ways to perform data transfers.

For instance, in a first type of data transfer session, the source and destination agents perform an authentication process, and a cookie or similar mechanism is established at the source and destination computer systems to be used for authentication. Data representing an object is transferred from the source agent in the form of packets that are each encrypted according to the cookie. The destination agent receives the packets, ensuring that each received packet is part of the session and is received in order. After confirming an object is successfully received, the destination agent requests a next object. The source and destination agents may re-perform the authentication process prior to transferring the next object, or may proceed with transferring the next object using the already-established cookie for authentication.

This type of data transfer session has disadvantages. For example, authentication is a lengthy/costly process, and if authentication is performed before transferring each object, a relatively high process cost is incurred. Alternatively, if multiple objects are transferred based on a single authentication (e.g., using a single cookie), data transfer security is reduced.

In another type of data transfer session, the source and destination agents perform an authentication process, and all objects to be transferred from the source agent are transferred. The destination agent waits until it receives the objects, and then indicates to the source agent whether all of the objects were successfully received. This type of data transfer session also has disadvantages. For example, the data packets representing the objects must all be confirmed to be received by the destination agent prior to completing the session. The destination computer system may need a relatively large amount of memory/storage to store the received packets representing the objects prior to determining that the session is complete. If the destination agent crashes before all data packets are received, and loses its state with regard to the session, the session may need to be completely re-performed, including re-performing authentication and transmission of all data packets.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques for secure data transfer between a source agent at a first computer system and a destination agent at a second computer system are provided. The techniques enable one or more content structures (e.g., directory structures, websites, etc.) to be transferred from the first computer system to the second computer system. The secure data transfer may occur over multiple data transfer sessions between the source and destination agents. In a first data transfer session, a first set of the objects of the content structures may be transferred from the source agent to the destination agent, along with identifiers for a second set of the objects of the content structures that are not transferred. The destination agent transmits a request to the source agent for one or more of the second set of objects that are to be transferred. In a second data transfer session, the source agent transfers the first set of objects of the content structures to the destination agent, and additionally transfers the requested objects of the second set of objects to the destination agent. The second transfer session may be "stateless" with respect to the first transfer session, in that the destination agent need have no "memory" with regard to the first transfer session to participate in the second transfer session (e.g., the second transfer session is "self-contained").

Methods for enabling secure data transfer between first and second computer systems are described. In one method (at the first computer system), a first list of labels of content structures is generated. The first computer system engages in a first data transfer session with the second computer system. During the first data transfer session, authentication information, the first list, at least one object included in the content structures, and file identifiers for one or more files included in the content structures are transferred to the second computer system. A second list is received from the second computer system. The second list lists at least one requested file identified by the transmitted file identifier(s). During a second data transfer session, authentication information, the first list, the at least one object, and the requested file(s) are transferred to the second computer system.

In another method (at the second computer system), the second computer system engages in a first data transfer session with the first computer system. During the first data transfer session, the first list, authentication information, at least one object included in the content structures, and file identifiers for one or more files included in the content structures are received from the first computer system. A second list is generated that lists at least one requested file identified by the received at least one file identifier that is not accessible at the second computer system. The second list is transmitted to the first computer system. A second data transfer session is engaged in with the first computer system. During the second data transfer session, authentication information, the first list, the at least one object, and the requested file(s) are received from the first computer system.

Systems for enabling secure data transfer are also described. For instance, in one implementation, a source agent includes a manifest generator and a data packager. The manifest generator is configured to generate a first list of labels of one or more content structures, each label in the first list corresponding to a content structure that includes a hierarchy of objects. The data packager is configured to package authentication information, at least one object included in the content structure(s), and at least one file identifier for at least one file included in the content structure(s) into a first data package. The first data package is transmitted to a destination agent during a first data transfer session. A second list is received from the destination agent that lists at least one requested file identified by the transmitted at least one file identifier. The data packager is configured to retrieve the requested file(s), and to package authentication information, the first list, the at least one object, and the requested file(s) into a second data package. The second data package is transmitted to the destination agent during a second data transfer session.

In another implementation, a destination agent includes a first processing module and a second processing module. The first processing module is configured to receive authentication information and a first list of labels of one or more content structures in a first portion (e.g., header or other portion) of a first data package received from a source agent in a first data transfer session. The one or more content structures each include a hierarchy of objects, and are located at a remote computer system. The second processing module is configured to process at least one object of the content structure(s) and at least one file identifier for at least one file of the content structure(s) that are received in a second portion (e.g., body or other portion) of the first data package. The second processing module is configured to generate a second list that lists at least one requested file identified according to the received file identifier(s) that is not accessible to the destination agent. The second list is transmitted to the source agent. A second data package is received from the source agent in a second data transfer session. The second data package includes authentication information and the first list of labels in a first portion (e.g., header or other portion), and the at least one object and the requested file(s) in a second portion (e.g., body or other portion). The second processing module is configured to process the received object(s) and requested file(s).

Computer program products are also described herein that enable secure data transfer, source agents, and destination agents, as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
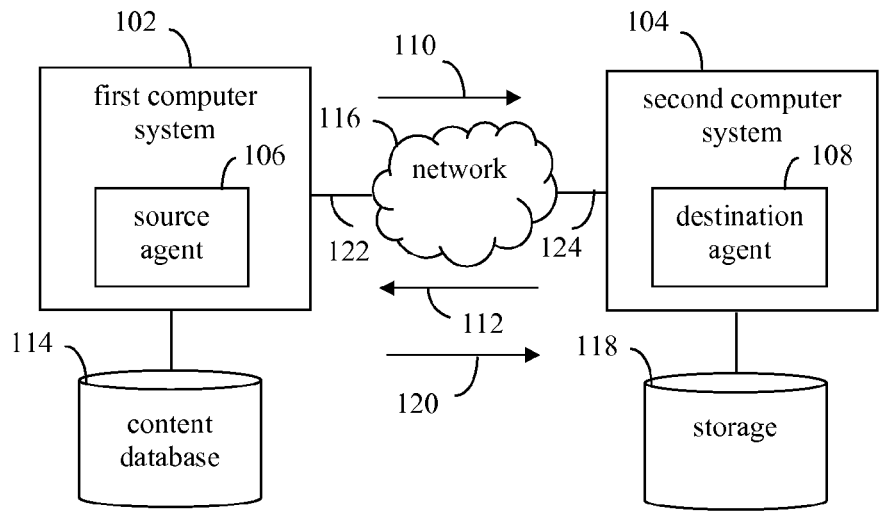
FIG. 1 shows a block diagram of a secure data transfer system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down,"

"top," "bottom," "vertical," "horizontal," etc.) used herein are for purposes of illustration only, and that practical implementations of the structures described herein can be spatially arranged in any orientation or manner.

II. Example Embodiments for Secure Data Transfer

Data may be transferred (e.g., copied or moved) between computer systems in various ways. For example, a particular data file may be transmitted from a source computer system to a destination computer system in the form of a stream of packets. In the case of IP (Internet protocol) packets, each packet contains a portion of the data of the data file, and includes an IP address for the destination computer system. The destination computer system receives the stream of packets, reassembles the data file, and may store and/or process the data file in any manner.

An important issue in computer communications is the maintaining of security for the transferred data. It is desired to be able to transfer data between computer systems over a network without the data being intercepted and exploited by unintended entities. Various security protocols exist for securing communications by authenticating and/or encrypting each data packet of a data stream. Examples of such security protocols include Internet Protocol Security (IPsec), Secure Sockets Layer (SSL), Transport Layer Security (TLS), and Secure Shell (SSH).

In conventional systems, agents may be configured to provide secure data transfers between computer systems in various ways. For instance, in a first type of data transfer session, the source and destination agents perform an authentication process, and a cookie or similar mechanism is established at the source and destination computer systems to be used for authentication. Data representing an object is transferred from the source agent in the form of packets that are each encrypted according to the cookie. After confirming an object is successfully received, the destination agent requests a next object. The source and destination agents may re-perform the authentication process prior to transferring the next object, or may proceed with transferring the next object using the already-established cookie for authentication. In a second type of data transfer session, the source and destination agents perform an authentication process, and all objects to be transferred from the source agent are transferred in the form of packets. The destination agent waits to receive all of the objects, and indicates to the source agent whether all of the objects were successfully received.

These types of data transfer sessions have disadvantages. In the first type, if authentication is performed before transferring each object, a relatively high process cost is incurred. Alternatively, if multiple objects are transferred based on a single authentication (e.g., using a single cookie), data transfer security is reduced. In the second type, the data packets representing the objects must all be confirmed to be received by the destination agent prior to completing the session. The destination computer system may need a relatively large amount of memory/storage to store the received packets prior to determining that the session is complete. If the destination agent crashes before all data packets are received, and loses its state with regard to the session, the session may need to be completely re-performed, including re-performing authentication and transmission of all data packets.

Embodiments described herein overcome these disadvantages, reducing the costs of authentication, reducing memory/storage requirements at the destination computer system, and/or providing greater fault tolerance.

For example, FIG. 1 shows a block diagram of a secure data transfer system 100, according to an example embodiment. As shown in FIG. 1, system 100 includes first computer system 102, a second computer system 104, a content database 114, a network 116, and storage 118. First computer system 102 includes a source agent 106, and second computer system 104 includes a destination agent 108. System 100 is configured to enable secure data transmissions between first and second computer systems 102 and 104. These elements of system 100 are described as follows.

Source agent 106 is configured to perform secure transfers of data from first computer system 102. For instance, source agent 106 may retrieve objects from content database 114 (and/or other data source), and generates a data package which includes the objects and/or labels for the objects, authentication information, and/or optionally further information. First computer system 102 generates a first communication signal 110 that includes the data package, and that is transmitted from first computer system 102 through a first communication link 122, network 116, and a second communication link 124, to second computer system 104. First communication signal 110 may include data transmitted in any form, including in the form of a stream of packets (e.g., IP packets). Second computer system 104 receives first communication signal 110.

Destination agent 108 processes the data package, and determines which of the objects for which labels were received that are desired to be received. Second computer system 104 generates a response signal 112 that includes a list of the objects desired to be received. Response signal 112 is transmitted through second communication link 124, network 116, and first communication link 122 to first computer system 102. Source agent 106 processes the list of objects to obtain the listed objects from content database 114. First computer system 102 generates a second communication signal 120 that includes the contents of the previously generated data package, and further includes the listed objects obtained by source agent 106. First computer system 102 transmits second communication signal 120 through network 116 to second computer system 104. Second communication signal 120 may include data transmitted in any form, including in the form of a stream of packets (e.g., IP packets). Second computer system 104 receives second communication signal 120. Destination agent 108 processes the data package and further objects included in second communication signal 120. Destination agent 108 may optionally store the received objects in storage 118.

In this manner, and as further described below, data may be securely and statelessly transferred from first computer system 102 to second computer system 104 using source and destination agents 106 and 108, respectively.

First and second computer systems 102 and 104 may each be any type of computing device, including a desktop computer (e.g., a personal computer), a server, a mobile computer or computing device (e.g., a Palm® device, a RIM Blackberry® device, a personal digital assistant (PDA), a laptop computer, a notebook computer, etc.), or other type of computer system.

Content database 114 and storage 118 may include one or more of any type of storage mechanism to store content (e.g., objects), including a hard disk drive, an optical disc drive, a memory device such as a RAM device, a ROM device, etc., and/or any other suitable type of storage medium. Examples of content that may be stored in content database 114 and/or storage 118 (and that may be transferred) includes objects such as audio files, video files, image files, web pages, scripts (e.g., database scripts), etc.

Network 116 may include one or more communication links and/or communication networks, such as a PAN (personal area network), a LAN (local area network), a WAN (wide area network), or a combination of networks, such as the Internet. First and second communication links 122 and 124, which respectively couple first and second computer systems 102 and 104 to network 116, may include any number of communication links, including wired and/or wireless links, such as IEEE 802.11 wireless LAN (WLAN) wireless links, Worldwide Interoperability for Microwave Access (WiMAX) links, cellular network links, wireless personal area network (PAN) links (e.g., Bluetooth™ links), Ethernet links, USB links, etc.

Source agent 106 and destination agent 108 may be implemented in hardware, software, firmware, or any combination thereof. For example, source agent 106 and/or destination agent 108 may be implemented as computer program code configured to be executed in one or more processors. Alternatively, source agent 106 and/or destination agent 108 may be implemented as hardware logic/electrical circuitry.

Figure 2:
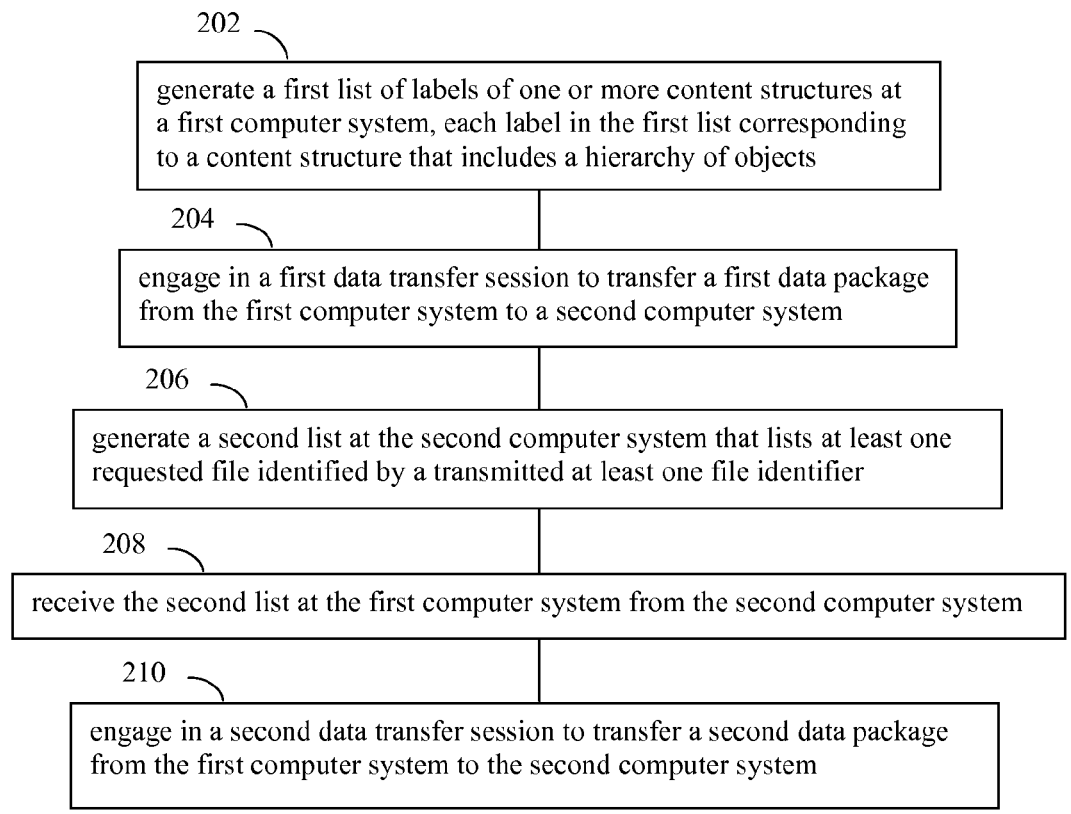
FIG. 2 shows a flowchart for secure data transfer, according to an example embodiment.
Figure 3:
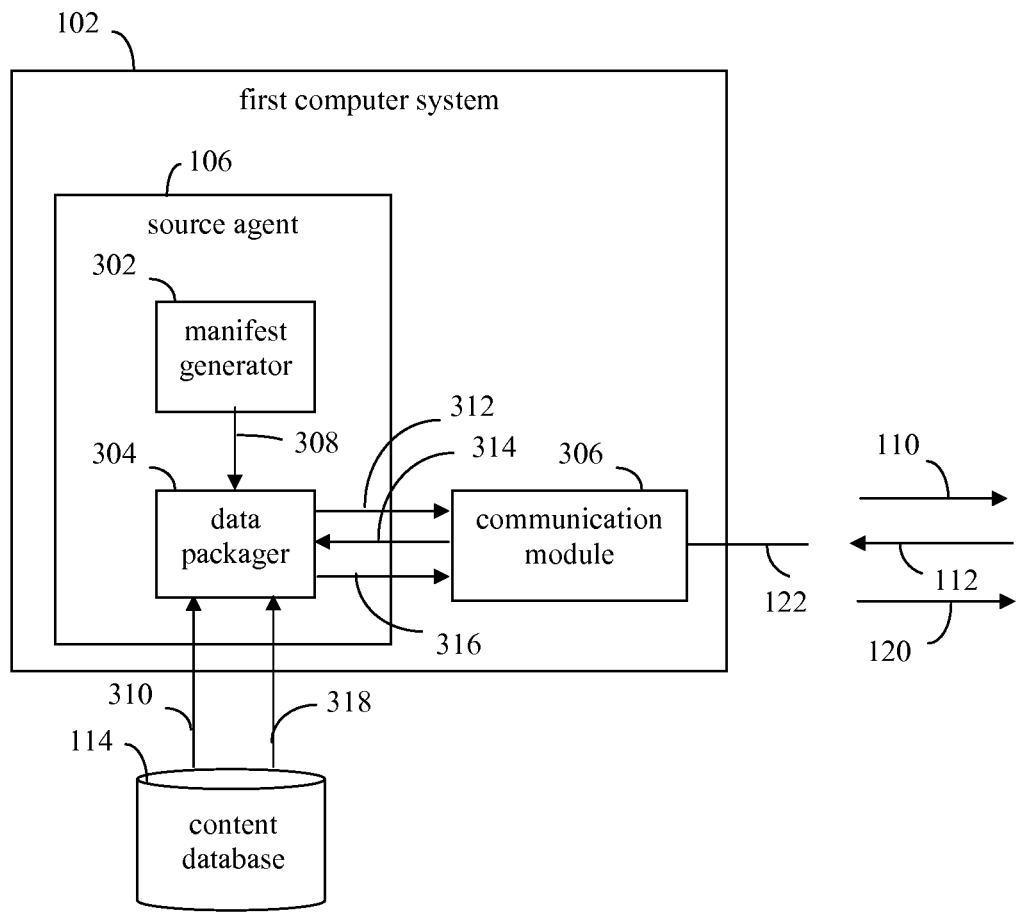
FIGS. 3 and 4 show block diagrams of the computer systems shown in FIG. 1, which each include secure data transfer agents, according to example embodiments.
Figure 4:
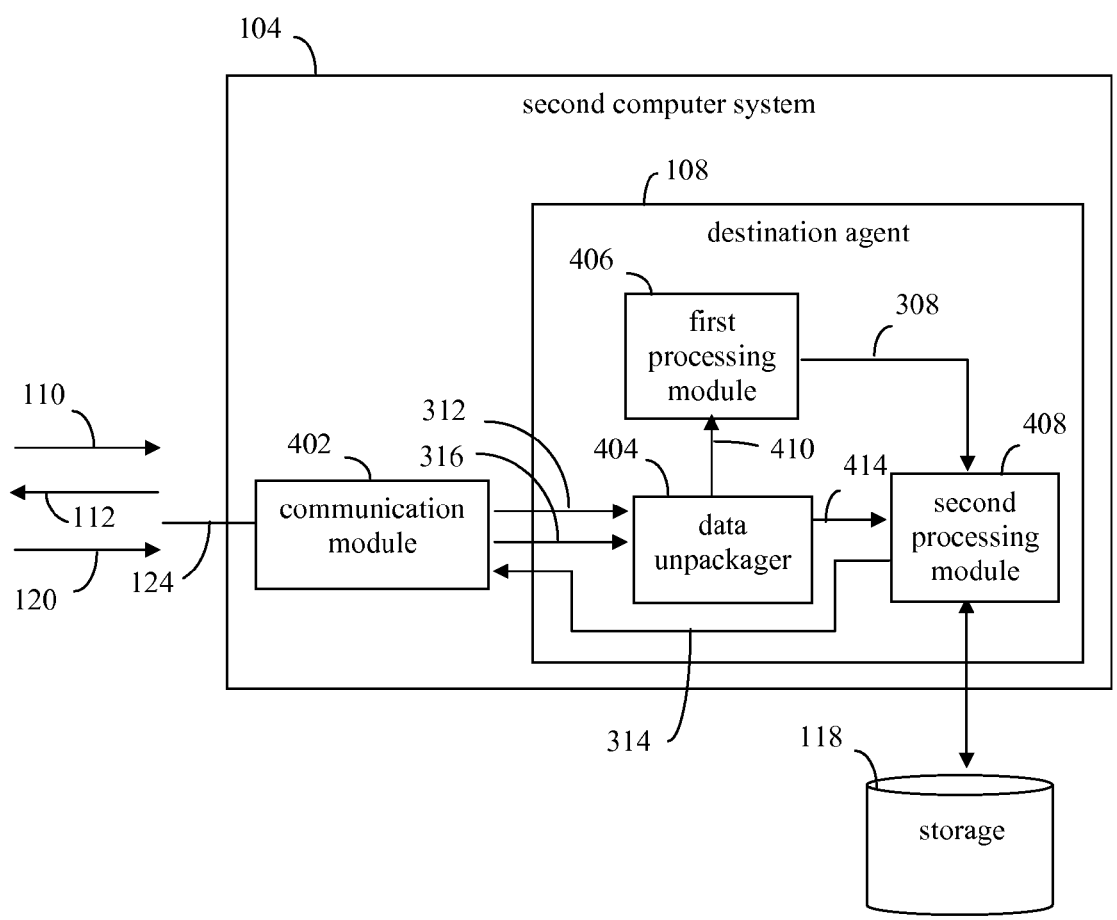

Secure data transfer may be performed in system 100 in various ways. For instance, FIG. 2 shows a flowchart 200 for secure data transfer, according to an example embodiment. Flowchart 200 may be performed by system 100 shown in FIG. 1, for example. For illustrative purposes, flowchart 200 is described with reference to FIGS. 3 and 4. FIG. 3 shows a block diagram of first computer system 102 of FIG. 1, according to an example embodiment. FIG. 4 shows a block diagram of second computer system 104, according to an example embodiment. As shown in FIG. 3, first computer system 102 includes source agent 106 and a communication module 306. Source agent 106 includes a manifest generator 302 and a data packager 304. As shown in FIG. 4, second computer system 104 includes destination agent 108 and a communication module 402. Destination agent 108 includes a data unpackager 404, a first processing module 406, and a second processing module 408. Further structural and operational embodiments will be apparent to persons skilled in the relevant art(s) based on the discussion regarding flowchart 200. Flowchart 200 is described as follows.

In step 202, a first list of labels of one or more content structures is generated at a first computer system, each label in the first list corresponding to a content structure that includes a hierarchy of objects. For example, as shown in FIG. 3, manifest generator 302 of source agent 106 may perform step 202. Manifest generator 302 may be configured to generate a list 308 of labels for one or more content structures that are to be transferred from first computer system 102 to second computer system 104. Any number of content structures may be transferred, and the particular content structures to be transferred may be selected in any manner. For example, in one case, second computer system 104 may transmit a request for one or more content structures to first computer system 104, and manifest generator 302 may add labels of the requested content structure(s) to list 308. In another case, a user at first computer system 102 may determine (e.g., may input at a user interface of first computer system 102) the content structure(s) to be transferred to second computer system 104, and manifest generator 302 may add labels for the determined content structure(s) to list 308.

Figure 5:
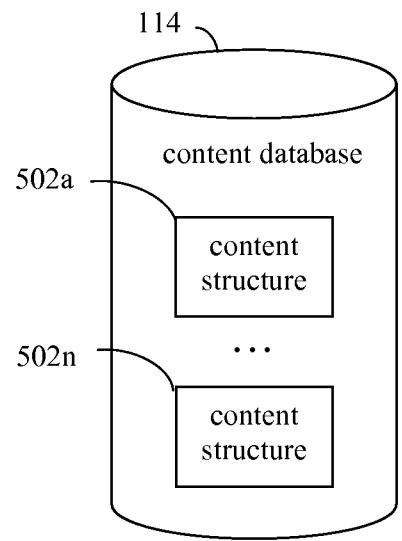
FIG. 5 shows a block diagram of a content database, according to an example embodiment.

In an embodiment, the content structures to be transferred to second computer system 102 may be stored in content database 114 coupled to first computer system 102. For instance, FIG. 5 shows a block diagram of content database 114, according to an example embodiment. As shown in FIG. 5, content database 114 includes a plurality of content structures 502a-502n. Any number of content structures 502 may be present in content database 114.

Figure 6:
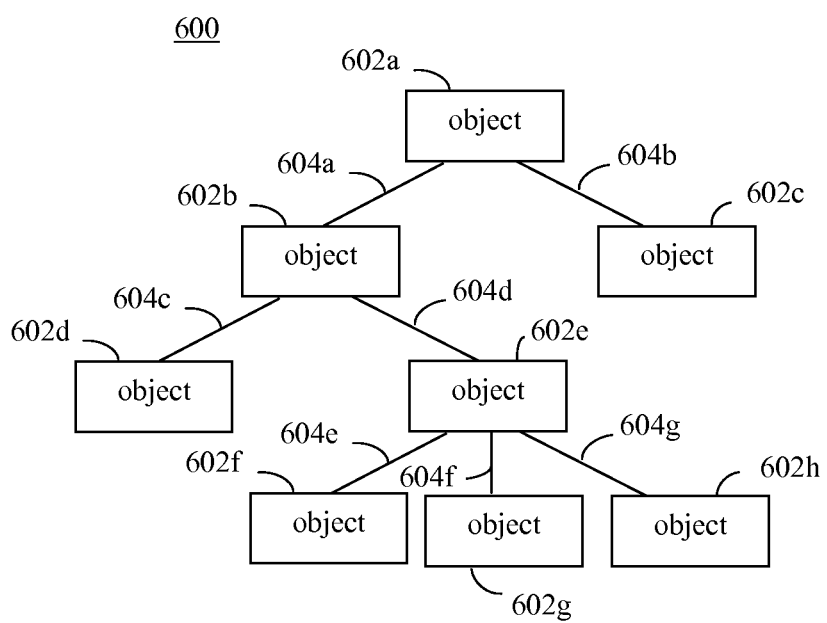
FIG. 6 shows an example content structure, according to an embodiment.

In an embodiment, content structures 502 may each include a hierarchy of objects. For instance, FIG. 6 shows an example content structure 600. As shown in FIG. 6, content structure 600 includes a plurality of objects 602a-602h that are interconnected by links 604a-604g. Each of links 604a-604g couples a parent object 602 to a corresponding child object 602. For example, object 602a is a parent object with respect to (child) objects 602b and 602c, being coupled to objects 602b and 602c by corresponding links 604a and 604b. In turn, object 602b is a parent object with respect to child objects 602d and 602e, being coupled to objects 602d and 602e by corresponding links 604c and 604d. A parent object 602 may be coupled to any number of child objects 602 by corresponding links 604.

In the embodiment of FIG. 6, content structure 600 is a unidirectional tree structure such that a first object 602 that is a child of a second object 602 may not also be a parent object 602 to that second object 602, directly or indirectly. In other words, there are no feedback links 604 to higher objects 602 in content structure 600 from lower objects 602 in content structure 600 (content structure 600 is unidirectional from higher/parent objects 602 to lower/child objects 602). However, in another embodiment, content structure 600 may have links 604 that feedback from lower objects 602 to higher objects 602 such that content structure 600 is not unidirectional but instead is bidirectional (i.e., in such an embodiment, content structure 600 may be referred to as a "graph" structure rather than a "tree" structure).

Examples of content structures 502 and 600 include directory structures, registry hives, websites (e.g., a collection of web pages and/or further web content), configuration data, etc. Examples of objects include directories, registry nodes, script files, and web content, such as audio files, image files, audio files, video files, web page files, etc.

Referring back to FIG. 3, although referred to herein as a "list," list 308 generated by manifest generator 302 may be embodied in various ways, including as any type of data structure such as a text file, a table, a data array, a database, etc., that is capable of containing labels for content structures. Examples of content structure labels include directory names that may or may not include a full path (e.g., "content folder" or "/user/joe/contentfolder"), website labels (e.g., "Microsoft" or "www.microsoft.com"), registry labels ("HKEY_LOCAL_MACHINE"), or any other label type (e.g., an alphanumeric, binary, hexadecimal, or other representation) that is human and/or machine readable.

Referring back to FIG. 2, in step 204, a first data transfer session is engaged in to transfer a first data package from the first computer system to a second computer system. For example, first and second computer systems 102 and 104 may perform step 204, as enabled by source agent 106 and destination agent 108. A first data transfer session may be engaged in to transfer a first data package from first computer system 102 to second computer system 104.

For instance, referring to FIG. 3, data packager 304 may be configured to generate a first data package 312 that includes objects and/or further information regarding the content structures listed in list 308. Data packager 304 may include authentication information (e.g., an authentication/security certificate, a cookie, etc.) used to authenticate (e.g., encrypt, decrypt, etc.) communications between first and second computer systems 102 and 104 in first data package 312 (e.g., may encrypt packets transmitted by communication module 306 in first communication signal 110).

Furthermore, as shown in FIG. 3, data packager 304 receives first list 308. Data packager 304 may be configured to access content database 114 to retrieve one or more objects 310 included in the one or more content structures listed in list 308. Data packager 304 may include first list 308 and the retrieved object(s) 310 in first data package 312. In an embodiment, data packager 304 may include all or a portion of object(s) 310 in first data package 312. For example, data packager 304 may include in first data package 312 one or more particular types of objects, and/or objects that have a file size less than a predetermined threshold file size. For instance, in an embodiment, objects included in first data package 312 may be relatively smaller sized objects, and objects that are not included in first data package 312 may be relatively large sized objects. In this manner, a size of first data package 312 may be reduced. Objects of object(s) 310 that are large in size, and thus would add to a transfer cost for first data package 312, but that may already be present at second computer system 104 (and thus potentially do not need to be transferred), are not transferred in first data package 312. In another embodiment, objects that are files are not included in first data package 312 by data packager 304, while other types of objects are included.

Examples of such other types of objects that may be included in first data package 312 by data packager 304 include configuration information/settings, registry key(s), and further types of objects. Furthermore, file identifiers may be included in first data package 312 by data packager 304 for any objects of object(s) 310 that are not included in data package 312 (e.g., that were excluded due to file size, object type, etc.). Such file identifiers may have the form of filenames, file size information, file checksum information, and/or further identifying information.

Figure 7:
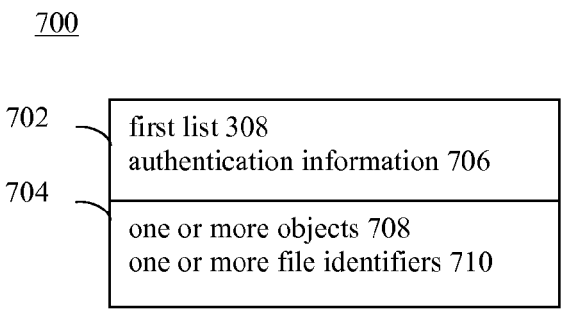
FIG. 7 shows a block diagram of a data package, according to an example embodiment.

Data packager 304 may package information in first data package 312 in various ways. For instance, FIG. 7 shows a block diagram of a data package 700, which is an example of first data package 312, according to an embodiment. As shown in FIG. 7, data package 700 includes a first portion 702 and a second portion 704. First and second portions 702 and 704 may be any respective portions of data package 700. For instance, first portion 702 may be a header portion of data package 700, and second portion 704 may be a body portion of data package 700. In the example of FIG. 7, first list 308 and authentication information 706 are included in first portion 702, and one or more objects 708 and one or more file identifiers 710 are included in second portion 704. In other embodiments, first data package 312 may have a form other than represented in FIG. 7.

As shown in FIG. 3, communication module 306 receives first data package 312 from data packager 304, and generates first communication signal 110, which includes first data package 312. Referring to FIG. 1, communication module 306 may transmit first communication signal 110 from first computer system 102 (through first communication link 122, network 116, and second communication link 124) to second computer system 104.

Figure 8:
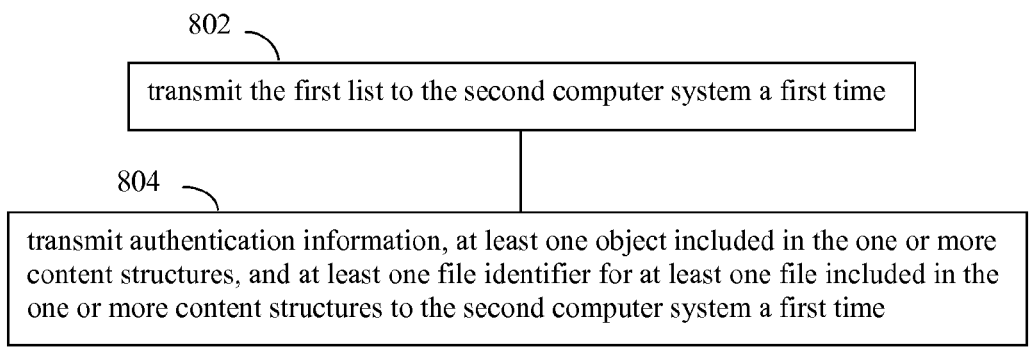
FIG. 8 shows a flowchart that may be performed by a source computer system, according to an example embodiment.
Figure 9:
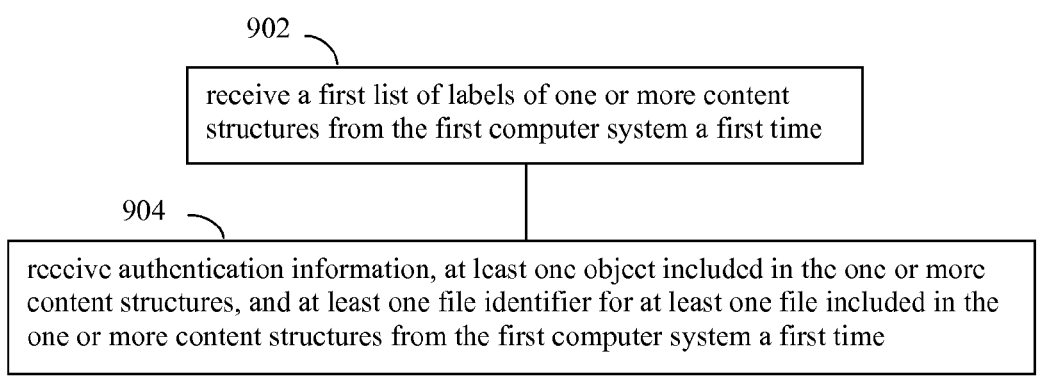
FIG. 9 shows a flowchart that may be performed by a destination computer system, according to an embodiment.

For example, FIG. 8 shows a flowchart 800 that may be performed by first computer system 102 and FIG. 9 shows a flowchart 900 that may be performed by second computer system 102 during step 204 (FIG. 2), according to an embodiment. As shown in FIG. 8, in step 802, the first list is transmitted to the second computer system a first time. In step 804, authentication information, at least one object included in the one or more content structures, and at least one file identifier for at least one file included in the one or more content structures is transmitted to the second computer system a first time. For example, referring to FIG. 1, first computer system 102 may transmit list 308 and one or more objects and/or file identifiers (e.g., obtained from objects stored in content database 114) to second computer system 104 through network 116. As described above, this information may be packaged in the form of first data package 312.

Referring to FIG. 9, in step 902, a first list of labels of one or more content structures is received from the first computer system a first time. In step 904, authentication information, at least one object included in the one or more content structures, and at least one file identifier for at least one file included in the one or more content structures are received from the first computer system a first time. For example, referring to FIG. 1, second computer system 104 may receive list 308 and one or more objects and/or file identifiers (e.g., obtained from objects stored in content database 114) from first computer system 102 through network 116.

Referring back to FIG. 2, in step 206, a second list is generated at the second computer system that lists at least one requested file identified by a transmitted at least one file identifier. For example, the second list may be generated at second computer system, as enabled by destination agent 108.

As shown in the embodiment of FIG. 4, communication module 402 receives first communication signal 110. Communication module 402 extracts first data package 312 from first communication signal 110. Data unpackager 404 receives and unpackages first data package 312 into a first portion 410 (e.g., a header or other portion) and a second portion 414 (e.g., a body or other portion). Data unpackager 404 may be configured to unpackage first data package 312 as it is received (e.g., provide portions of first portion 410 and/or second portion 414 respectively to first processing module 406 and/or second processing module 408 as they are received) or after first data package 312 is completely received. As shown in FIG. 4, first processing module 406 receives first portion 410. First portion 410 may include authentication information (e.g., authentication information 706 of FIG. 7), first list 308, and optionally further header information of first data package 312. First processing module 406 is configured to process the header information, which may include processing the authentication information to authenticate first communication signal 110. Furthermore, first processing module 406 outputs first list 308, which is received by second processing module 408.

Second processing module 408 is configured to process (e.g., decompress, store, configure, etc.) any objects (e.g., one or more objects 708 of FIG. 7) received in first data package 312, and any file identifiers (e.g., one or more file identifiers 710) received in second portion 414 of first data package 312. For example, in an embodiment, second processing module 408 may process the objects in the order they are received in first data package 312, as first data package 312 is received. In such an embodiment, second processing module 408 may process a received object while other objects are still being received and/or have not yet been received by second computer system 104 in first data package 312. In this manner, all objects do not need to be collected in memory/storage before being processed, saving memory/storage resources at second computer system 104.

Furthermore, second processing module 408 determines any objects of content structures listed in first list 308 that are already locally present (e.g., stored in storage 118) (i.e., second processing module 408 "builds" objects in first list 308, creating a view of the objects such that it can determine which objects are and are not locally present). For example, second processing module 408 may access one or more of the listed content structures in storage 118, if at least partially present, to determine which objects of the listed content structures are present in storage 118. Second processing module 408 compares each file identifier received in second portion 414 of first data package 312 to the objects determined to be present in storage 118. If a file identifier identifies a file that is present in storage 118 (or is otherwise locally present), second processing module 408 determine that the file identified by the file identifier does not need to be transferred from first computer system 102. If a file identifier identifies a file that is not present in storage 118 (and is not otherwise locally present), second processing module 408 determines that the file identified by the file identifier needs to be transferred from first computer system 102, and includes the identifier in a list of requested files. As shown in FIG. 4, second processing module 408 generates a second list 416, which lists at least one requested file identified according to the received file identifier(s) that is not accessible to destination agent 108 (e.g., is not present in storage 118 or elsewhere local to second computer system 104), and thus is desired to be received at second computer system 104.

Although referred to herein as a "list," list 416 generated by second processing module 408 may be embodied in various ways, including as any type of data structure such as a text file, a table, a data array, a database, etc., that is capable of containing file identifiers.

Referring back to FIG. 2, in step 208, the second list is received at the first computer system from the second computer system. For example, as shown in FIG. 4, communication module 402 of second computer system 104 receives second list 416 from second processing module 408. Communication module 402 generates response signal 112, which includes second list 416. Response signal 112 is transmitted from communication module 402 at second computer system 104 to first computer system 102.

In step 210, a second data transfer session is engaged in to transfer a second data package from the first computer system to the second computer system. For example, first and second computer systems 102 and 104 may perform step 210, as enabled by source agent 106 and destination agent 108. Step 210 is generally similar to step 204, with differences described as follows.

Referring to FIG. 3, data packager 304 may be configured to generate a second data package 316 that includes information regarding the content structures listed in list 308. Similarly as described above, data packager 304 may include first list 308 and authentication information used to authentication communications between first and second computer systems 102 and 104 in second data package 316. For improved security for second data package 316, and for a stateless communication between first and second computer systems 102 and 104, new authentication information may be generated that is included in second data package 316. In this manner, the communication of second data package 316 to second computer system 104 by first computer system 102 cannot be compromised by a third party that obtained the authentication information included in first data package 312.

As shown in FIG. 3, communication module 306 receives response signal 112. Communication module 306 extracts second list 314 from response signal 112. Data packager 304 receives second list 314, which includes a list of one or more requested files. Data packager 304 may be configured to access content database 114 to retrieve the one or more files 318 listed in second list 314, and to include the retrieved file(s) 318 in second data package 316. In this manner, files that are included in content structures listed in first list 308 that were not transferred in first data package 312 are transferred to second computer system 104 in second data package 316. Furthermore, only the files requested by second computer system 104 in second list 314 are transferred, saving a data transfer cost (e.g., in data package size, time of transfer, processing cost, etc.) by not transferring files that are already present at second computer system 104.

Figure 10:
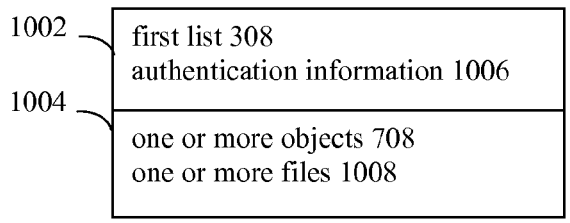
FIG. 10 shows a block diagram of a data package, according to an example embodiment.

For instance, FIG. 10 shows a block diagram of a data package 1000, which is an example of second data package 316, according to an embodiment. As shown in FIG. 10, data package 1000 includes a first portion 1002 and a second portion 1004. In the example of FIG. 10, first list 308 and authentication information 1006 are included in first portion 1002, and one or more objects 708 (that were also included in first data package 312) and one or more files 1008 are included in second portion 1004. In other embodiments, first data package 312 may have a form other than represented in FIG. 10. According to the embodiment of FIG. 10, second data package 316 may be received and processed by second computer system 104, regardless of whether or not second computer system 104 lost (e.g., crashed) or did not otherwise maintain state information related to first data package 316. Second data package 316 includes information to authenticate the communication with second computer system 104 (authentication information 1006), includes first list 308 (which indicates the content structures being transferred), includes objects 708 (which may provide configuration information, etc.), and includes files 1008, which are the files requested by second computer system 104 in second list 314. Thus, second data package 316 includes the information needed to transfer the content structures listed in first list 308 to second computer system 104 without needing reference to any information included in first data package 312, and therefore is a stateless communication. Accordingly, source and destination agents 106 and 108 may be referred to as "stateless agents," because they enable stateless transfers of data between first and second computer systems 102 and 104.

In an embodiment, second processing module 408 may process the objects/files in the order they are received in second data package 316, as second data package 316 is received. In such an embodiment, second processing module 408 may process a received object while other objects are still being received and/or have not yet been received by second computer system 104 in second data package 316. In this manner, all objects do not need to be collected in memory/storage before being processed, saving memory/storage resources at second computer system 104.

As shown in FIG. 3, communication module 306 receives second data package 316 from data packager 304, and generates second communication signal 120, which includes second data package 316. Referring to FIG. 1, communication module 306 may transmit second communication signal 120 from first computer system 102 (through first communication link 122, network 116, and second communication link 124) to second computer system 104.

Figure 11:
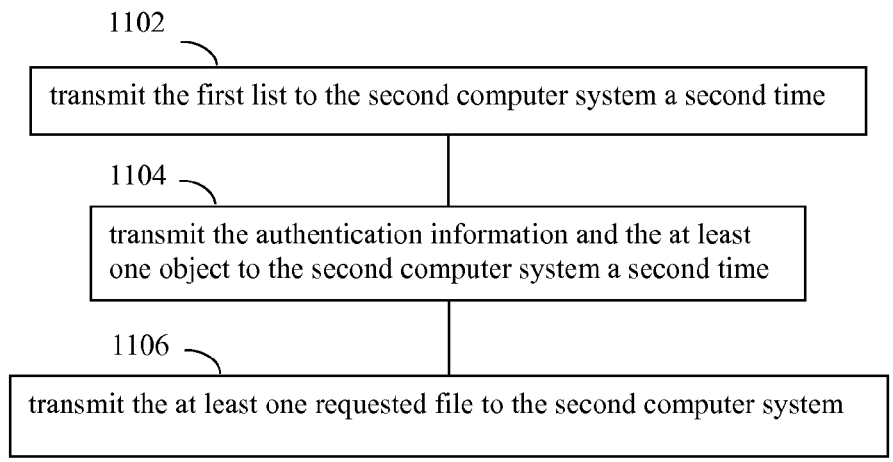
FIG. 11 shows a flowchart that may be performed by a source computer system, according to an example embodiment.
Figure 12:
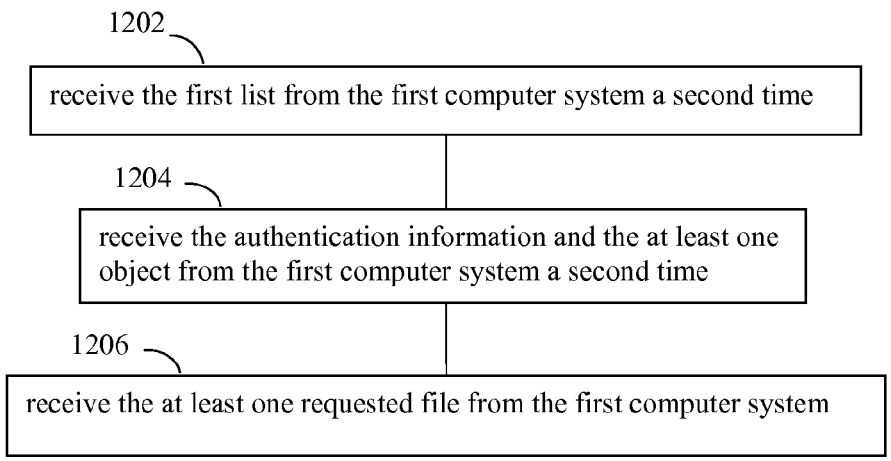
FIG. 12 shows a flowchart that may be performed by a destination computer system, according to an embodiment.

For example, FIG. 11 shows a flowchart 1100 that may be performed by first computer system 102 and FIG. 12 shows a flowchart 1200 that may be performed by second computer system 102 during step 210 (FIG. 2), according to an embodiment. As shown in FIG. 11, in step 1102, the first list is transmitted to the second computer system a second time. In step 1104, the authentication information and the at least one object are transmitted to the second computer system a second time. In step 1106, the at least one requested file is transferred to the second computer system. For example, referring to FIG. 1, first computer system 102 may transmit list 308, the previously transferred one or more objects (e.g., objects 708 shown in FIGS. 7 and 10), and the requested files (e.g., files 1008 shown in FIG. 10) to second computer system 104 through network 116. As described above, this information may be packaged in the form of second data package 316.

Referring to FIG. 12, in step 1202, the first list is received from the first computer system a second time. In step 1204, the authentication information and the at least one object are received from the first computer system a second time. In step 1206, the at least one requested file is received from the first computer system. For example, referring to FIG. 1, second computer system 104 may receive list 308, the previously received one or more objects (e.g., objects 708 shown in FIGS. 7 and 10), and the requested files (e.g., files 1008 shown in FIG. 10) from first computer system 102 through network 116.

Figure 13:
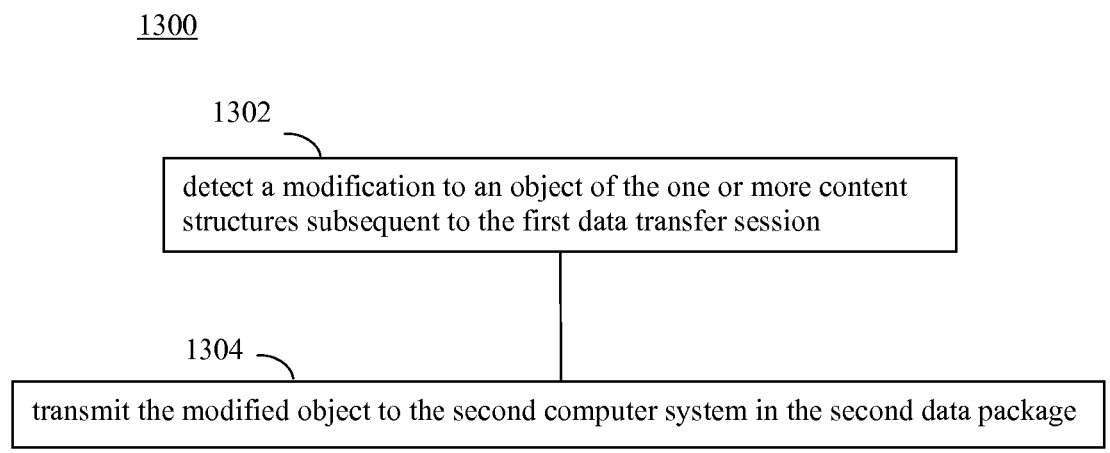
FIG. 13 shows a flowchart for transferring modified objects, according to an embodiment.

Note that in some situations, one or more objects of the content structures transferred from the first computer system 102 to the second computer system 104 in first data package 312 may have been modified (e.g., changed/updated) after the first data transfer session (step 204). In such a situation, the modified version of the object(s) may be included in second data package 316 by first computer system 102 for transfer to second computer system 104. For example, in an embodiment, data packager 304 of source agent 106 in FIG. 3 may be configured to perform a flowchart 1300 shown in FIG. 13. Referring to FIG. 13, in step 1302, a modification to an object of the one or more content structures subsequent to the first data transfer session is detected. In step 1304, the modified object is transmitted to the second computer system in the second data package. Any number of modified objects may be transferred in this manner.

Second computer system 104 may process second data package 316 in a similar fashion as described above for first data package 312. For example, second computer system 104 may process second data package 316 in a "stateless" manner, with no reference to the previous processing of first data package 316.

For instance, as shown in the embodiment of FIG. 4, communication module 402 receives second communication signal 120. Communication module 402 extracts second data package 316 from second communication signal 120. Data unpackager 404 receives and unpackages second data package 316 into first portion 410 and second portion 414. Data unpackager 404 may be configured to unpackage second data package 316 as it is received or after it is completely received. As shown in FIG. 4, first processing module 406 receives first portion 410. First portion 410 may include authentication information (e.g., authentication information 1006 of FIG. 10), first list 308, and optionally further header information of second data package 316. First processing module 406 is configured to process the header information, which may include processing the authentication information to authenticate packets of second communication signal 120. Furthermore, first processing module 406 outputs first list 308, which is received by second processing module 408.

Second processing module 408 is configured to process (e.g., decompress, store, configure, etc.) any objects (e.g., one or more objects 708 of FIG. 10) and any files (e.g., one or more files 1008) received in second portion 414 of second data package 316. For example, in an embodiment, second processing module 408 may process the objects and files in the order they are received in second data package 316, as second data package 316 is received. In such an embodiment, second processing module 408 may process a received object and/or file while other objects/files are still being received and/or have not yet been received by second computer system 104 in second data package 316.

After processing of second data package 316 by second computer system 104, transfer of the data of the one or more content structures listed in first list 308 to second computer system 104 is complete. After receiving first data package 312, second processing module 408 of second computer system 104 determined which files of the content structure(s) that were not provided in first data package 312 were needed by second computer system 104, and these files were listed in second list 314. Because second data package 316 included the files requested by second computer system 104 in second list 314, all of the contents of the one or more content structures are present at second computer system 104 after receiving second data package 316—either provided in first data package 312, second data package 316, or already present. Furthermore, in an embodiment, because second data package 316 includes authentication information, the one or more objects transmitted in first data package 316, and the requested files, second data package 316 is a self contained mechanism for transferring the content structure(s) to second computer system 104 from first computer system 102. It does not matter whether second computer system 104 lost state (e.g., losing memory of, by crashing, by deletion, etc.) with regard to first data package 316, because everything needed to transfer the content structure(s) (e.g., in their entirety, or whatever was not present) to second computer system 104 is present in second data package 316. Thus, the communication mechanism according to flowchart 200 is a "stateless" mechanism.

For instance, if second computer system 104/destination agent 108 loses state after the first data transfer session (step 204) and prior to generating the list of requested files (step 206) or transmitting the list (step 208), flowchart 200 may be reinitiated at step 204 (step 202 may or may not be repeated) by re-performing/repeating the first data transfer session. Even though the first data transfer session is repeated, relatively low cost is expended because the first data transfer session does not include all files (e.g., large files, all files, or other combination of files are excluded from transfer to second computer system 104 during the first data transfer session). If second computer system 104/destination agent 108 loses state after transmitting the list of requested files (step 208) and prior to the second data transfer session (step 210), the second data transfer session (step 210) may be performed on schedule without modification because of the stateless nature of the second data transfer session. Furthermore, if first computer system 102/source agent 106 loses state at any point during the process, flowchart 200 may be reinitiated at step 204 (step 202 may or may not be repeated) by re-performing/repeating the first data transfer session.

Furthermore, embodiments described herein are fault tolerant, including being tolerant to communication faults occurring during the first data transfer session (step 204) and the second data transfer session (210). For example, in an embodiment, if a loss of communication is detected at first computer system 102 with second computer system 104 during the first data transfer session (step 204), first computer system 102 and second computer system 104 can repeat the first data transfer session (step 204). As described above, even when the first data transfer session is repeated, relatively low cost is expended, because the first data transfer session does not include all files (e.g., large files, all files, or other combination of files, are excluded from transfer to second computer system 104 during the first data transfer session). In an embodiment, if a loss of communication is detected at first computer system 102 with second computer system 104 during the second data transfer session (step 210), first computer system 102 and second computer system 104 can repeat the second data transfer session (step 210). In such an embodiment, there is no need to repeat the first data transfer session (step 204) because the second data transfer session is stateless with regard to the first data transfer session.

Manifest generator 302 and data packager 304 shown in FIG. 3 and data unpackager 404, first processing module 406, and second processing module 408 may be implemented in hardware, software, firmware, or any combination thereof. For example, manifest generator 302, data packager 304, data unpackager 404, first processing module 406, and/or second processing module 408 may be implemented as computer program code configured to be executed in one or more processors. Alternatively, manifest generator 302, data packager 304, data unpackager 404, first processing module 406, and/or second processing module 408 may be implemented as hardware logic/electrical circuitry. Communication module 306 (FIG. 3) and communication module 402 (FIG. 4) are configured to enable first and second computer systems 102 and 104, respectively, to communicate over network 116. Communication module 306 and communication module 402 may each be any type of communication/network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, etc.

III Further Example Embodiments

Figure 14:
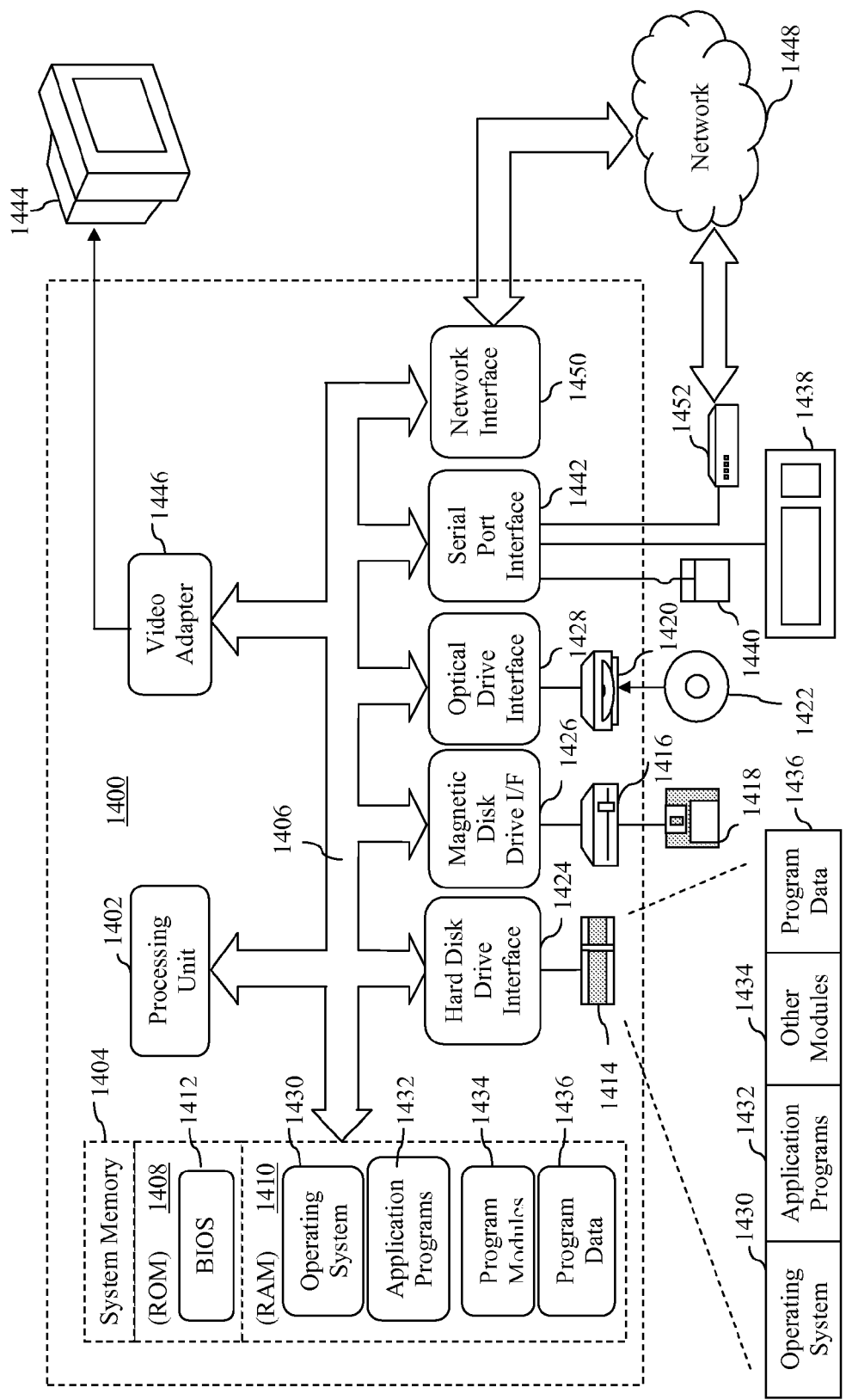
FIG. 14 shows a block diagram of an example computer that may be used to implement embodiments of the present invention.

FIG. 14 depicts an exemplary implementation of a computer 1400 in which embodiments may be implemented. For instance, computer systems 102 and 104 shown in FIG. 1 and FIGS. 3 and 4 may be implemented similarly to computer 1400, including one or more features of computer 1400 and/or alternative features. Computer 1400 may be a general-purpose computing device in the form of a conventional personal computer, a mobile computer, or a workstation, for example, or computer 1400 may be a special purpose computing device. The description of computer 1400 provided herein is provided for purposes of illustration, and is not intended to be limiting. Embodiments may be implemented in further types of computer systems, as would be known to persons skilled in the relevant art(s).

As shown in FIG. 14, computer 1400 includes a processing unit 1402, a system memory 1404, and a bus 1406 that couples various system components including system memory 1404 to processing unit 1402. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computer 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1430, one or more application programs 1432, other program modules 1434, and program data 1436. Application programs 1432 or program modules 1434 may include, for example, logic for implementing source agent 106 and/or destination agent 108, as described above. For example, application programs 1432 or program modules 1434 may include logic for implementing manifest generator 302 (FIG. 3), data packager 304 (FIG. 3), data unpackager (FIG. 4), first processing module 406 (FIG. 4), second processing module 408 (FIG. 4), and/or for implementing flowchart 200 (FIG. 2), flowchart 800 (FIG. 8), flowchart 900 (FIG. 9), flowchart 1100 (FIG. 11), flowchart 1200 (FIG. 12), flowchart 1300 (FIG. 13), and/or any step/process thereof, and/or any further embodiments described herein.

A user may enter commands and information into the computer 1400 through input devices such as keyboard 1438 and pointing device 1440. Other input devices (not shown) may include a microphone, joystick, game pad, satellite dish, scanner, or the like. These and other input devices are often connected to the processing unit 1402 through a serial port interface 1442 that is coupled to bus 1406, but may be connected by other interfaces, such as a parallel port, game port, or a universal serial bus (USB).

A monitor 1444 or other type of display device is also connected to bus 1406 via an interface, such as a video adapter 1446. In addition to the monitor, computer 1400 may include other peripheral output devices (not shown) such as speakers and printers.

Computer 1400 is connected to a network 1448 (e.g., the Internet) through a network interface or adapter 1450, a modem 1452, or other means for establishing communications over the network. Modem 1452, which may be internal or external, is connected to bus 1406 via serial port interface 1442.

As used herein, the terms "computer program medium" and "computer-readable medium" are used to generally refer to media such as the hard disk associated with hard disk drive 1414, removable magnetic disk 1418, removable optical disk 1422, (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Embodiments may employ any computer-useable or computer-readable medium, known now or in the future. Such computer-readable media may store program modules (e.g., application programs 1432, program modules 1434, etc.) that include logic for implementing embodiments described herein. Embodiments are directed to computer program products comprising such logic (e.g., in the form of program code) stored on any computer useable medium. Such program code, when executed in one or more data processing devices (e.g., processors), causes a device to operate as described herein. Such computer programs may also be received via network interface or adaptor 1450 or serial port interface 1442. Such computer programs, when executed or loaded by an application, enable computer 1400 to implement features of embodiments discussed herein. Accordingly, such computer programs represent controllers of the computer 1400.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a first computer system for secure data transfer, comprising:
   generating a first list of labels of one or more content structures, each label in the first list corresponding to a content structure that includes a hierarchy of files;
   engaging in a first data transfer session with a second computer system, said engaging in a first data transfer session comprising
      transmitting the first list to the second computer system a first time, and
      transmitting authentication information, at least one file included in the one or more content structures, and one or more file identifiers for one or more files included in the one or more content structures that are excluded from the first data transfer session to the second computer system a first time;
   receiving a second list from the second computer system that lists one or more requested files identified by the transmitted one or more file identifiers; and
   engaging in a second data transfer session with the second computer system, said engaging in a second data transfer session comprising
      transmitting the first list to the second computer system a second time,
      transmitting authentication information and the previously transmitted at least one file to the second computer system a second time, the previously transmitted at least one file being unmodified since being transmitted the first time, and
      transmitting the one or more requested files to the second computer system for a first time.

2. The method of claim 1, wherein said transmitting the first list to the second computer system a first time comprises:
   transmitting the first list to the second computer system in a first portion of a first data package; and
   wherein said transmitting authentication information, at least one file included in the one or more content structures, and one or more file identifiers for one or more files included in the one or more content structures that are excluded from the first data transfer session to the second computer system a first time comprises:
      transmitting authentication information, the at least one file, and the one or more file identifiers in a second portion of the first data package.

3. The method of claim 2, wherein said transmitting the first list to the second computer system a second time comprises:
   transmitting the first list to the second computer system in a first portion of a second data package;
   wherein said transmitting authentication information and the previously transmitted at least one file to the second computer system a second time comprises:
      transmitting authentication information and the previously transmitted at least one file in a second portion of the second data package; and
   wherein said transmitting the one or more requested files to the second computer system comprises:
      transmitting the one or more requested files to the second computer system in the second portion of the second data package.

4. The method of claim 1, wherein said engaging in a second data transfer session with the second computer system further comprises:
   detecting a modification to a file of the one or more content structures subsequent to the first data transfer session; and
   wherein said transmitting authentication information and the previously transmitted at least one file to the second computer system a second time comprises:
      transmitting the modified file to the second computer system.

5. The method of claim 1, further comprising:
   detecting a loss of communication with the second computer system during the second data transfer session; and
   repeating said engaging in the second data transfer session in response to said detecting.

6. A source agent, comprising:
   a manifest generator configured to generate a first list of labels of one or more content structures, each label in the first list corresponding to a content structure that includes a hierarchy of files; and
   a data packager, at least partially implemented by a processor, configured to package authentication information, at least one file included in the one or more content structures, and one or more file identifiers for one or more files included in the one or more content structures that are excluded from the first data transfer session into a first data package;
   the first data package being transmitted to a destination agent during a first data transfer session;
   a second list being received from the destination agent that lists one or more requested files identified by the transmitted one or more file identifiers;
   the data packager being configured to retrieve the one or more requested files, and to package the first list, authentication information, the previously transmitted at least one file, and the one or more requested files into a second data package, the previously transmitted at least one file being unmodified since being transmitted during the first data transfer session; and
   the second data package being transmitted to the destination agent during a second data transfer session, the one or more requested files being transmitted to the destination agent for a first time via the second data package.

7. The source agent of claim 6, wherein the first list of the first data package is transmitted to the destination agent in a first portion of the first data package, and authentication information, the at least one file, and the one or more file identifiers of the first data package are transmitted to the destination agent in a second portion of the first data package.

8. The source agent of claim 7, wherein the first list of the second data package is transmitted to the destination agent in a first portion of the second data package, and authentication information, the previously transmitted at least one file, and the one or more requested files of the second data package are transmitted to the destination agent in a second portion of the second data package.

9. The source agent of claim 6, wherein the data packager is configured to retrieve a modified file of the one or more content structures modified subsequent to the first data transfer session; and
   the modified file being transmitted to the destination agent during the second data transfer session.

10. The source agent of claim 6, wherein the first data transfer session is repeated if the source agent undergoes a loss of state.

11. A method for secure data transfer between a first computer system and a second computer system in the second computer system, comprising:
  engaging in a first data transfer session with the first computer system, said engaging in a first data transfer session comprising
    receiving a first list of labels of one or more content structures from the first computer system a first time, each label listed in the first list corresponding to a content structure that includes a hierarchy of files, and
    receiving authentication information, at least one file included in the one or more content structures, and one or more file identifiers for one or more files included in the one or more content structures that are excluded from the first data transfer session from the first computer system a first time;
  generating a second list that lists one or more requested files identified by the received one or more file identifiers that are not accessible at the second computer system;
  transmitting the second list to the first computer system; and
  engaging in a second data transfer session with the first computer system, said engaging in a second data transfer session comprising
    receiving the first list from the first computer system a second time,
    receiving authentication information and the previously received at least one file from the first computer system a second time, the previously received at least one file being unmodified since being received the first time, and
    receiving the one or more requested files from the first computer system for a first time.

12. The method of claim 11, wherein said engaging in a first data transfer session with the first computer system further comprises:
  processing each of the authentication information and the at least one file in an order received from the first computer system during the first data transfer session; and
  wherein said engaging in a second data transfer session with the first computer system comprises:
    processing each of the authentication information, the previously received at least one file, and the one or more requested files in an order received from the first computer system during the second data transfer session.

13. The method of claim 11, wherein said engaging in a second data transfer session with the first computer system comprises:
  engaging in the second data transfer session with the first computer system without reference to any state information related to the first data transfer session.

14. The method of claim 11, wherein said receiving a first list of labels of one or more content structures from the first computer system a first time comprises:
  receiving the first list in a first portion of a first data package; and
  wherein said receiving authentication information, at least one file included in the one or more content structures, and one or more file identifiers for at least one file included in the one or more content structures that are excluded from the first data transfer session from the first computer system comprises:
    receiving the authentication information, the at least one file, and the one or more file identifiers in a second portion of the first data package.

15. The method of claim 14, wherein said receiving the first list from the first computer system a second time comprises:
  receiving the first list from the first computer system in a first portion of a second data package;
  wherein said receiving authentication information and the previously received at least one file from the first computer system a second time comprises:
    receiving authentication information and the previously received at least one file from the first computer system in a second portion of the second data package; and
  wherein said receiving the one or more requested files from the first computer system comprises:
    receiving the one or more requested files from the first computer system in the second portion of the second data package.

16. The method of claim 11, wherein the at least one file received during the first data transfer session has a file size less than a predetermined threshold file size, and wherein at least another file received during the second data transfer session has a file size greater than or equal to the predetermined threshold file size.

17. A destination agent, comprising:
  a first processing module configured to receive authentication information and a first list of labels of one or more content structures in a first portion of a first data package received from a source agent in a first data transfer session, the one or more content structures each including a hierarchy of files and being located at a remote computer system; and
  a second processing module, at least partially implemented by a processor, configured to process at least one file of the one or more content structures and one or more file identifiers for one or more files of the one or more content structures that are excluded from the first data transfer session, the one or more file identifiers being received in a second portion of the first data package;
  the second processing module being configured to generate a second list that lists one or more requested files identified according to the received one or more file identifiers that are not accessible to the destination agent; and
  the second list being transmitted to the source agent, and a second data package being received from the source agent in a second data transfer session, the second data package including authentication information and the first list of labels in a first portion of the second data package and the previously received at least one file and the one or more requested files in a second portion of the second data package, the previously received at least one file being unmodified since being received during the first data transfer session, and the second processing module being configured to process the received one or more requested files, the one or more requested files being received from the source agent for a first time via the second data package.

18. The destination agent of claim 17, wherein the first processing module and the second processing module are configured to respectively process the authentication information and the at least one file in an order received during the first data transfer session; and
  the second processing module being configured to process the previously received at least one file and the one or more requested files in an order received during the second data transfer session.

19. The destination agent of claim 17, wherein the destination agent is enabled to process the second data package without reference to any state information related to the first data package.

20. The destination agent of claim 17, wherein the at least one file received during the first data transfer session has a file size less than a predetermined threshold file size, and wherein at least another file received during the second data transfer session has a file size greater than or equal to the predetermined threshold file size.

* * * * *